United States Patent [19]

Keck

[11] 4,386,920
[45] Jun. 7, 1983

[54] CONE PULLEY

[75] Inventor: Karl Keck, Leutesheim, Fed. Rep. of Germany

[73] Assignee: Luk Lamellen und Kupplungsbau GmbH, Bühl, Fed. Rep. of Germany

[21] Appl. No.: 260,976

[22] Filed: May 6, 1981

Related U.S. Application Data

[63] Continuation of Ser. No. 940,576, Sep. 8, 1978, abandoned.

[30] Foreign Application Priority Data

Sep. 8, 1977 [DE] Fed. Rep. of Germany ....... 2740443

[51] Int. Cl.³ .............................................. F16H 9/12
[52] U.S. Cl. .......................................... 474/39; 474/46
[58] Field of Search ...................... 474/39, 46, 40, 41, 474/42

[56] References Cited

U.S. PATENT DOCUMENTS

| 2,235,333 | 3/1941 | Reeves . |
| 2,253,357 | 8/1941 | Wetzel . |
| 2,641,138 | 6/1953 | Janow . |
| 2,855,787 | 10/1958 | Kumro et al. . |
| 3,571,884 | 3/1971 | Chung . |
| 3,736,804 | 6/1973 | Gregerich . |
| 3,786,688 | 1/1974 | Svenson . |
| 3,863,514 | 2/1975 | Jensen . |
| 3,893,343 | 7/1975 | Zaiser et al. . |
| 3,949,573 | 4/1976 | Jacobsson ............................ 474/39 |
| 4,010,654 | 3/1977 | Maucher et al. . |
| 4,019,398 | 4/1977 | Wesemeier . |

FOREIGN PATENT DOCUMENTS

| 131634 | 3/1949 | Australia ............................... 474/41 |
| 1131961 | 6/1962 | Fed. Rep. of Germany . |
| 413485 | 8/1910 | France ................................... 474/46 |
| 16686 | 3/1913 | France . |
| 1257706 | 2/1961 | France . |
| 13846 | of 1914 | United Kingdom . |
| 7048 | of 1914 | United Kingdom . |
| 907945 | 10/1962 | United Kingdom . |

Primary Examiner—Lawrence J. Staab
Attorney, Agent, or Firm—Kontler, Grimes & Battersby

[57] ABSTRACT

A cone pulley for a transmission with strand-like tensioning means includes at least two pulley parts which are axially displaceable relative to one another. The strand-like tensioning means is held by and between the two pulley parts. Biasing means is provided for biasing the two pulley parts to a closed position, that is toward one another, in axial direction. Furthermore, means is provided for reducing the biasing action of the biasing means and includes cooperating screw and nut members, operatively associated with the respective pulley parts.

9 Claims, 5 Drawing Figures

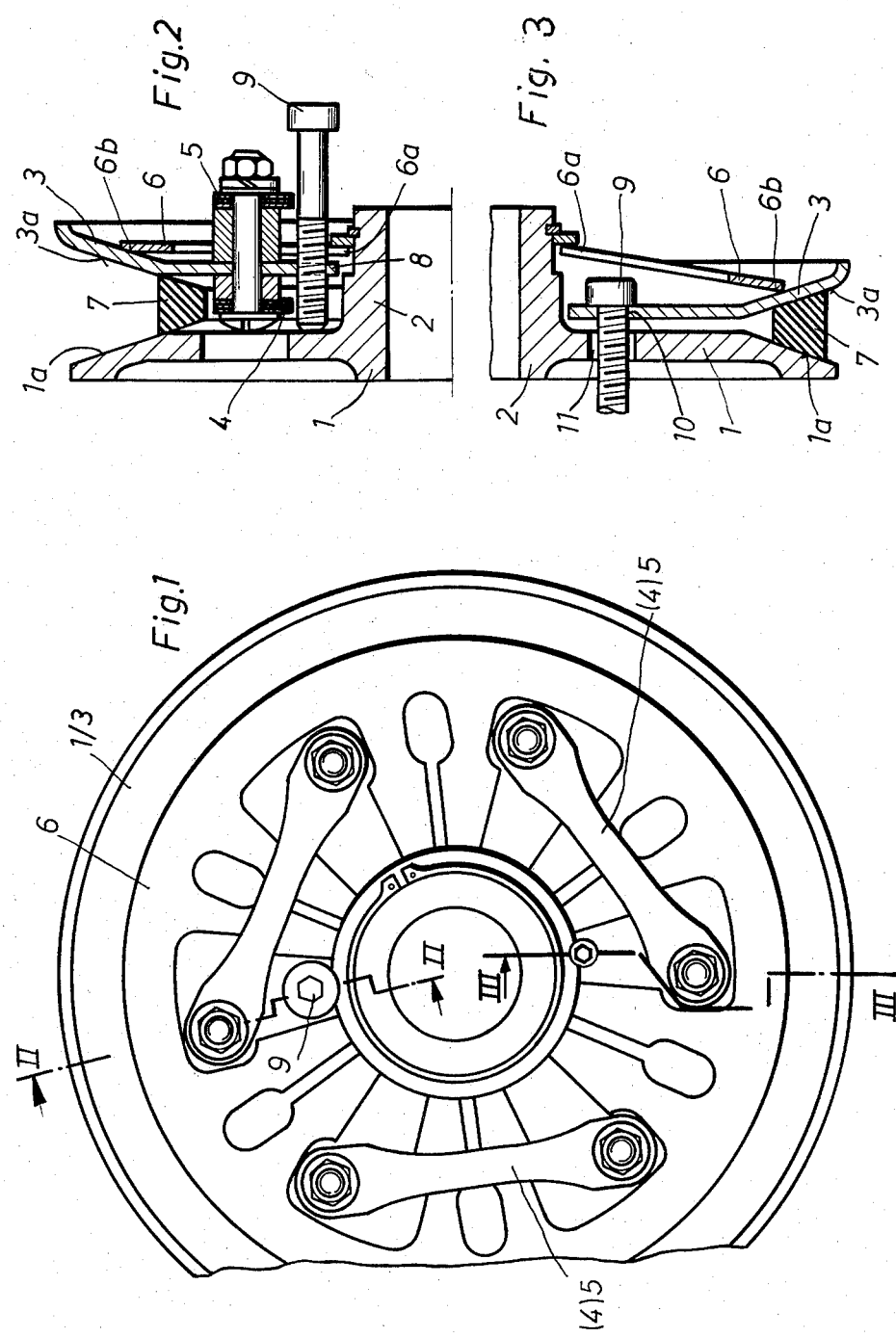

CONE PULLEY

This is a continuation, of application Ser. No. 940,576, filed Sept. 8, 1978 now abandoned.

BACKGROUND OF THE INVENTION

The invention relates to a cone pulley such as has become known from German Published application DE-OS 2 459 258. Such a pulley is used as a self-tensioning belt pulley, control pulley or the like for a transmission with strand-like tensioning means such as cone or V-belts. The cone pulley is formed of at least two pulley parts displaceable axially relative to one another, the two pulley parts holding or gripping the strand-like tensioning means therebetween and being biased to a closed position.

OBJECTS AND SUMMARY OF THE INVENTION

It is an object of the invention to provide a cone pulley of the foregoing general type wherein the disposition or replacement of the strand-like tensioning means such as a cone or V-belt, for example, is facilitated.

With the foregoing and other objects in view, there is provided, in accordance with the invention, a cone pulley for a transmission with strand-like tensioning means, the pulley being formed of at least two pulley parts axially displaceable relative to one another. The strand-like tensioning means is held by and between the two pulley parts. Biasing means is provided for biasing the two pulley parts to a closed position, that is, for displacing the pulley parts toward one another, in axial direction. The pulley further comprises means for reducing the biasing action. The reducing means includes cooperating screw and nut members operatively associated with the respective pulley parts.

In accordance with another feature of the invention, one of the pulley parts is fixed and the other is displaceable toward and away from the one pulley part. The biasing means comprises a spring member engageable at a radially outer region thereof with the displaceable puley part. The screw member is fixed with respect to the one pulley part, and the nut member is movable along the screw member and engageable with the spring member at a radially inner region thereof for stressing and relieving the spring member. The latter may be a plate or cup spring, for example.

In accordance with a further feature of the invention, the screw member comprises a central screw thread provided on the axially fixed pulley part, such as on a hub formed on the axially fixed pulley part, and the nut member may be threaded on the hub and displaced therealong.

In accordance with an added feature of the invention, the screw member and the nut member constitute spreading means between and engaging the pulley parts for forcibly displacing them axially away from one another.

In accordance with an additional feature of the invention, one pulley part (either the axially displaceable or the axially fixed pulley part) is or may be provided with either the nut or the screw member while the other of these members engages or abuts such pulley part (either the axially fixed or displaceable pulley-part, as the case may be).

In this regard, the threaded members may be coaxial with the pulley or displaced from the rotational axis of the same.

In accordance with yet another feature of the invention, a coaxial arrangement is provided and one of the pulley parts is axially fixed while the other is axially displaceable relative thereto. The screw member is centrally disposed on the axially fixed pulley part for threaded engagement with the nut member and the nut member has radially outwardly directed portions which engage the axially displaceable pulley part from behind. The nut member can simultaneously serve to brace a plate spring. During movement of the pulley parts away from one another, the axially displaceable pulley part as well as the plate spring are displaced relative to the axially fixed pulley part when the nut member is turned.

The threaded members can also be disposed eccentrically with respect to the rotational axis.

In accordance with yet a further feature of the invention, one of the pulley parts is fixed and the other is axially displaceable relative thereto with the nut member being carried by the axially displaceable pulley part. The screw member may be threaded into the nut member and braced against the axially fixed pulley part. The pulley parts can then be displaced away from one another against the force of the biasing means by causing the latter to exert the closing action on the axially displaceable pulley part.

In accordance with the invention, the nut member may be provided on the axially displaceable or axially fixed pulley part by forming one of the pulley parts with a thread, for example. It is another feature of the invention to press fit or weld the nut member onto one of the pulley parts, especially when the latter are made from thin-walled sheets.

In accordance with yet a further feature of the invention, one of the pulley parts is provided with a recess, and the nut member is fixed, in or at the recess for example, by introducing the nut member into the recess together with a screw member.

In accordance with another feature of the invention, a further nut thread is provided in one of the pulley parts and is arranged to receive the screw member. The other pulley part is formed with an axial extension of the further nut thread and the axial extension is provided with a recess to accommodate the screw member.

Other features which are considered as characteristic for the invention are set forth in the appended claims.

Although the invention is illustrated and described herein as embodied in a cone pulley, it is nevertheless not intended to be limited to the details shown, since various modifications and structural changes may be made therein without departing from the spirit of the invention and within the scope and range of equivalents of the claims.

The construction and method of operation of the cone pulley, however, together with additional objects and advantages of the invention, will be best understood from the following description of specific embodiments when read in connection with the accompanying drawings.

BRIEF DESCRIPTION OF THE DRAWINGS

FIG. 1 is an elevational view of a cone pulley constructed in accordance with the invention;

FIG. 2 is a fragmentary cross-sectional view of FIG. 1 taken along the line II—II in direction of the arrows;

FIG. 3 is a fragmentary cross-sectional view of FIG. 1 taken along the line III—III in direction of the arrows;

DESCRIPTION OF THE PREFERRED EMBODIMENTS

Figure 5:
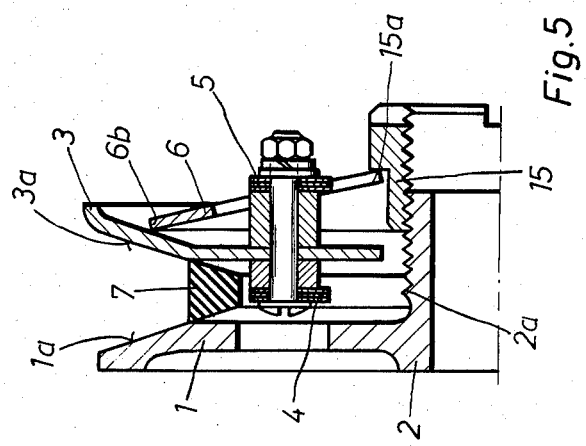
FIG. 5 is a view similar to those of FIGS. 2 and 4 of a third embodiment of the invention wherein the closing action of the biasing means is reduced.

Referring now to FIGS. 1 to 3 of the drawings, there is shown a cone or V-belt pulley according to the invention. The pulley includes an axially fixed pulley part 1 having a hub 2 via which the pulley part 1 may be connected in a conventional manner to a non-illustrated shaft or axle. An axially displaceable pulley part 3 is fastened to the axially fixed pulley part 1 through two systems of leaf springs 4 and 5 mutually spaced apart in axial direction.

A biasing element in the form of a plate or cup spring 6, which has a radially inner region 6a by which it is braced against the hub 2 and a radially outer region 6b by which it is braced against the axially displaceable pulley part 3, biases the axially displaceable pulley part 3 in direction toward the axially fixed pulley part 1 and toward a cone or V-belt 7 disposed between the pulley parts 1 and 3, thereby producing a so-called closing force. This closing force, which is effective over the operating range of the cone or V-belt pulley that is determined or defined by the conical surfaces 1a and 3a, effects self-regulating adjustment of the cone or V-belt tension.

To facilitate replacement of the cone belt 7, a threaded bore 8 shown in FIG. 2 is formed in the axially displaceable pulley part 3 and receives a screw 9 which bears against an abutment surface on the fixed cone-belt pulley part 1. By screwing the screw 9 into the tapped bore 8, the axially displaceable pulley part 3 is drawn away from the pulley part 1 against the force of the plate spring 6 to an extent that the cone belt 7 can be moved radially inwardly between the pulley parts 1 and 3 beyond the smallest operating diameter. This is illustrated in FIG. 2 and enables the cone belt 7 to be passed over the rim of the non-illustrated, one-piece cone-belt pulley at the other end of the run of the endless cone belt 7. By unthreading the screw 9, the belt drive is ready for operation and the plate spring 6 controls the tension of the cone belt 7 automatically.

FIG. 3 shows that a screw 9 can also extend through the axially fixed pulley part 1. A tapped or threaded bore 10 is formed in the axially displaceable pulley part 3 and the screw 9 is threaded therein. This tapped bore 10 is located opposite a recess 11 formed in the axially fixed pulley part 1.

Figure 4:
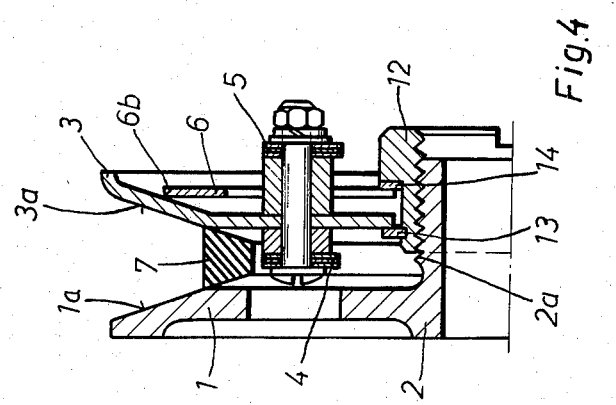
FIG. 4 is a view similar to that of FIG. 2 of another embodiment of the invention.

FIG. 4 illustrates an embodiment of the invention wherein a forcible withdrawal of the axially displaceable pulley part 3 from the axially fixed pulley part 1 is effected by forming the hub 2 with a thread 2a which meshes with a nut 12. A snap ring or circlip 13 engages the axially displaceable pulley part 3 from behind while the radially inner region 6a of the plate spring 6 engages a shoulder 14 formed on the nut 12. By turning the nut 12, the axially displaceable pulley part 3 and the plate spring 6 are withdrawn from the axially fixed pulley part 1 so that the cone belt 7 can be inserted far beyond the radially inner operating diameter. The cone belt 7 can then be placed on the other, non-illustrated cone-belt pulley of the drive.

In the embodiment of FIG. 5, a thread 2a is likewise formed on the hub 2 and a nut 15 is provided to thread onto the hub 2 in axial direction thereof. A region 15a of the nut 15 serves to engage the radially inner plate-spring region 6a. In the illustrated position, the nut 15 is axially spaced from the pulley part 3, and the plate spring 6 is relieved or unloaded so that the cone belt 7 can be put on. Stressing the plate spring 6 by screwing the nut 15 further onto the threaded hub 2 enables the cone-belt pulley to be brought into the operating condition thereof.

There is claimed:

1. A pulley, particularly for use in a transmission, comprising:
   (a) a first pulley part rotatable about a predetermined axis and movable in a direction substantially parallel to said axis;
   (b) a second pulley part rotatable about said axis and fixed against movement in said direction, said first and second pulley parts cooperating to define a tapered groove for receiving a tapered tension member, and said second pulley part including a hub which is designed to be secured to a shaft rotatable on said axis, said first pulley part receiving said hub and being arranged to rotate about said axis while said hub is received therein, and said hub being threaded;
   (c) a threaded locking member threaded onto said hub and having a section which extends radially of said axis, said section being arranged to abut said first pulley part upon displacement of said locking member away from said second pulley part to thereby draw said first pulley part away from said second pulley part; and
   (d) a cup spring biasing said first pulley part towards said second pulley part, said cup spring having a portion which is radially spaced from said axis and acts on said first pulley part, and said cup spring being arranged such that displacement of said locking member away from said second pulley part causes a reduction in the biasing force of said cup spring.

2. A pulley, particularly for use in a transmission, comprising:
   (a) a first pulley part rotatable about a predetermined axis and movable in a direction substantially parallel to said axis, said first pulley part being provided with an opening;
   (b) a second pulley part rotatable about said axis and fixed against movement in said direction, said first and second pulley parts cooperating to define a groove for receiving a tension member;
   (c) a first threaded element arranged on one of said pulley parts at a location radially spaced from said axis;
   (d) a second threaded element arranged to mate with said first threaded element and to abut the other of said pulley parts so as to cause displacement of said first pulley part away from said second pulley part upon relative rotation of said first and second threaded elements in a predetermined sense, wherein one of said threaded elements is received in the other of said threaded elements and said other threaded element is arranged in said opening for movement with said first pulley part; and
   (e) biasing means for biasing said first pulley part towards said second pulley part, said biasing means being arranged such that displacement of said first pulley part away from said second pulley part causes a reduction in the biasing force thereof.

3. A pulley as defined in claim 2, wherein the spacing between said first and second pulley parts is automatically adjustable in response to variations in the force applied to said pulley.

4. A pulley, particularly for use in a transmission, comprising:
   (a) a first pulley part rotatable about a predetermined axis and movable in a direction substantially parallel to said axis;
   (b) a second pulley part rotatable about said axis and fixed against movement in said direction, said first and second pulley parts cooperating to define a groove for receiving a tension member;
   (c) a first threaded element arranged on one of said pulley parts at a location radially spaced from said axis;
   (d) a second threaded element arranged to mate with said first threaded element and to abut the other of said pulley parts so as to cause displacement of said first pulley part away from said second pulley part upon relative rotation of said first and second threaded elements in a predetermined sense, wherein one of said threaded elements is received in the other of said threaded elements, said other threaded element being arranged on said first pulley part for movement therewith and said one threaded element being arranged to abut said second pulley part; and
   (e) biasing means for biasing said first pulley part towards said second pulley part, said biasing means being arranged such that displacement of said first pulley part away from said second pulley part causes a reduction in the biasing force thereof.

5. A pulley as defined in claim 4, wherein the spacing between the first and second pulley parts is automatically adjustable in response to variations in the force applied to said pulley.

6. A pulley, particularly for use in a transmission, comprising:
   (a) a first pulley part rotatable about a predetermined axis and movable in a direction substantially parallel to said axis;
   (b) a second pulley part rotatable about said axis and fixed against movement in said direction, said first and second pulley parts cooperating to define a groove for receiving a tension member, said second pulley part further including an opening therein;
   (c) a first threaded element arranged on one of said pulley parts at a location radially spaced from said axis;
   (d) a second threaded element arranged to mate with said first threaded element and to abut the other of said pulley parts so as to cause displacement of said first pulley part away from said second pulley part upon relative rotation of said first and second threaded elements in a predetermined sense, wherein one of said threaded elements is received in the other of said threaded elements and said other threaded element is arranged in said opening; and
   (e) biasing means for biasing said first pulley part towards said second pulley part, said biasing means being arranged such that displacement of said first pulley part away from said second pulley part causes a reduction in the biasing force thereof.

7. A pulley as defined in claim 6, wherein the spacing between the first and second pulley parts is automatically adjustable in response to variations in the force applied to said pulley.

8. A pulley, particularly for use in a transmission, comprising:
   (a) a first pulley part rotatable about a predetermined axis and movable in a direction substantially parallel to said axis;
   (b) a second pulley part rotatable about said axis and fixed against movement in said direction, said first and second pulley parts cooperating to define a groove for receiving a tension member;
   (c) a first threaded element arranged on one of said pulley parts at a location radially spaced from said axis;
   (d) a second threaded element arranged to mate with said first threaded element and to abut the other of said pulley parts so as to cause displacement of said first pulley part away from said second pulley part upon relative rotation of said first and second threaded elements in a predetermined sense;
   (e) a third threaded element on one of said pulley parts, said third threaded element adapted to receive a cooperating threaded element therein and wherein the other of said pulley parts is provided with an opening which is aligned with said third threaded element so as to permit said cooperating threaded element to extend into said opening when the cooperating threaded element is received in said third threaded element; and
   (f) biasing means for biasing said first pulley part towards said second pulley part, said biasing means being arranged such that displacement of said first pulley part away from said second pulley part causes a reduction in the biasing force thereof.

9. A pulley as defined in claim 8, wherein the spacing between said first and second pulley parts is automatically adjustable in response to variations in the force applied to said pulley.

* * * * *